June 24, 1930.   E. R. LAWTON   1,768,410
WINDOW SHADE DEVICE
Filed Oct. 4, 1929   3 Sheets-Sheet 1
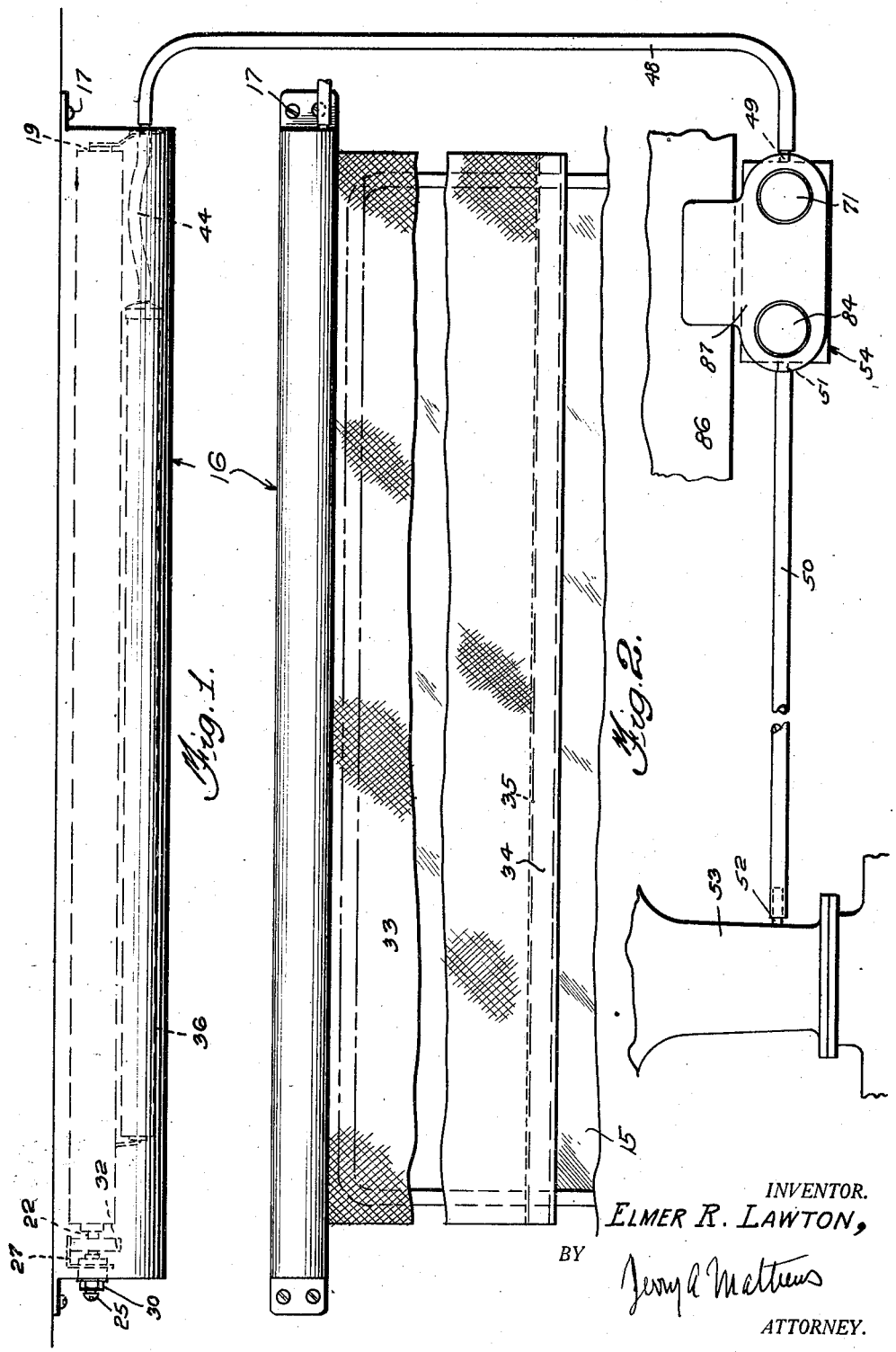
INVENTOR.
ELMER R. LAWTON,
BY
ATTORNEY.

June 24, 1930. E. R. LAWTON 1,768,410
WINDOW SHADE DEVICE
Filed Oct. 4, 1929 3 Sheets-Sheet 2
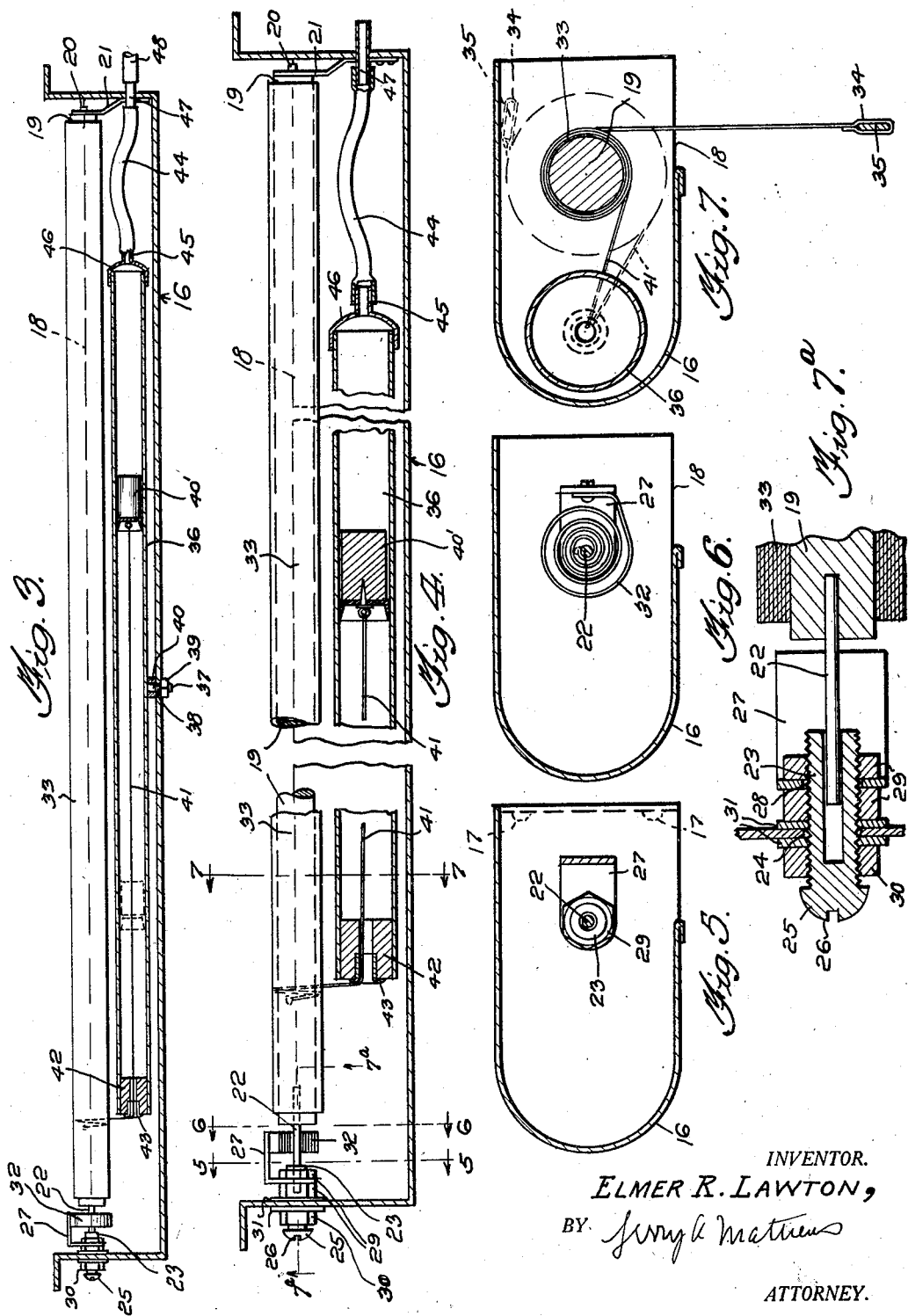
INVENTOR.
ELMER R. LAWTON,
BY
ATTORNEY.

June 24, 1930.  E. R. LAWTON  1,768,410
WINDOW SHADE DEVICE
Filed Oct. 4, 1929   3 Sheets-Sheet 3
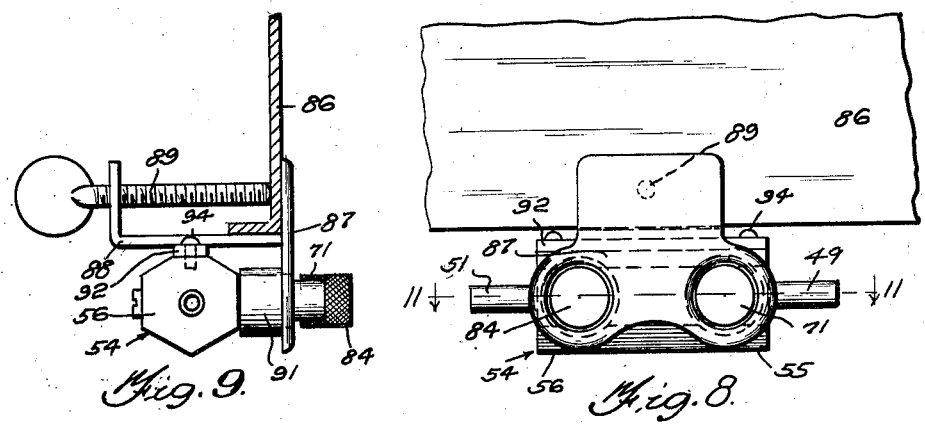
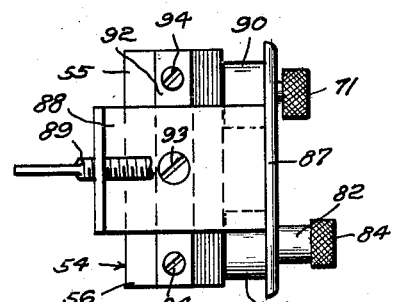
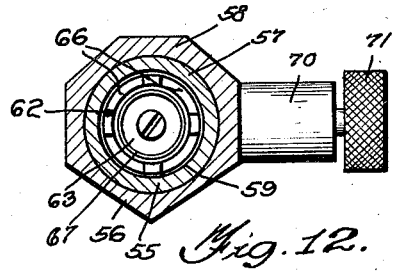
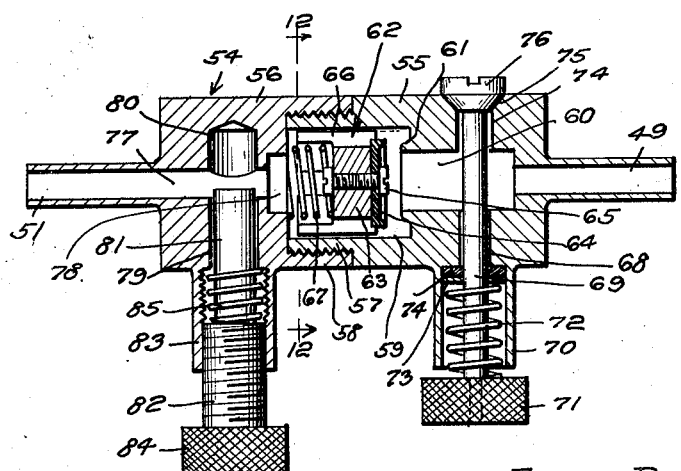
INVENTOR.
ELMER R. LAWTON,
BY
ATTORNEY.

Patented June 24, 1930

1,768,410

UNITED STATES PATENT OFFICE

ELMER R. LAWTON, OF PHILADELPHIA, PENNSYLVANIA

WINDOW-SHADE DEVICE

Application filed October 4, 1929. Serial No. 397,245.

My invention relates to a window shade, and to the operating means for the same.

As is well known, considerable difficulty is encountered in driving an automobile at night, by the glare produced from bright headlights of an automobile, approaching from the rear. This blinding light passes through the rear window of the automobile body and strikes upon the windshield of the automobile being driven and also upon the mirror. The blinding effect is also produced by light from the sun. Automobiles are ordinarily equipped with a shade which may be lowered to cover the rear window. However, it is difficult and frequently impossible for a driver to lower the shade in sufficient time to prevent accidents.

In accordance with my invention, I provide a shade arranged to cover the rear window and I provide suction operating means to actuate the shade in one direction, preferably to lower the same. By this means, the power to actuate the shade may be derived from the suction line of the engine, such as the intake manifold. The control valve for the suction line may be located upon the dash or at any other suitable convenient point in the automobile body, to be in ready reach of the driver, without liability of the driver losing control of the automobile. By the use of my invention, the driver may conveniently raise or lower the shade, at will. Means are also provided to hold the shade in the shifted position, and to prevent the same from improperly moving from such position, upon the degree of suction varying in a portion of a suction line. The device is extremely simple in construction, formed of relatively few parts, and reliable in operation. It is neat in appearance, and may be built in an independent unit to be applied to an automobile, without altering the construction of the same, except for connecting up with the suction line. The operating parts of the device are preferably enclosed in a housing to prevent the same from being tampered with.

Other objects and advantages of the invention will be apparent during the course of the following description.

In the accompanying drawings, forming a part of this specification, and in which like numerals are employed to designate like parts throughout the same, Figure 1 is a plan view of apparatus embodying my invention, Figure 2 is a side elevation of the same, Figure 3 is a plan view of the shade unit, the housing and cylinder being shown in horizontal section, Figure 4 is a similar view upon an enlarged scale, parts broken away, Figure 5 is a transverse section taken on line 5—5 of Figure 4, Figure 6 is a similar view taken on line 6—6 of Figure 4, Figure 7 is a similar view taken on line 7—7 of Figure 4, Figure 7ª is a longitudinal section taken on line 7ª—7ª of Figure 4, Figure 8 is a side elevation of a valve device, Figure 9 is an end elevation of the same, Figure 10 is a plan view of the same, Figure 11 is a horizontal section taken on line 11—11 of Figure 8, and, Figure 12 is a transverse section taken on line 12—12 of Figure 11.

In the drawings, wherein for the purpose of illustration, is shown a preferred embodiment of my invention, the numeral 15 designates the rear window of an automobile body. Arranged above this rear window is a housing or casing 16, which is horizontally disposed and attached to the body by screws 17, or other suitable means. The housing 16 is provided in its bottom with a longitudinal opening 18, for the passage of the shade element, as will be described.

The shade embodies a roll or cylinder 19, formed of wood or the like. A pin or trunnion 20 is attached to one end of the roll 19, and is rotatably held within a bracket 21 attached to the end of the housing 16. The opposite end of the roll 19 has a shaft 22 rigidly secured to the same, for rotation therewith, and this shaft is rotatably mounted within a tubular bearing element 23. This tubular bearing element extends through an opening 24 in the adjacent end of the housing 16 and is provided upon the outer side of this end with a head 25, having a groove 26 for receiving a screw driver or the like implement for turning the same. The numeral 27 designates an L-shaped bracket, having an opening 28, formed therein, to receive the tubular bearing. This tubular bearing is exteriorly threaded, but has no screw-threaded engagement with the wall of the opening 28, and carries a pair of clamping nuts 29, arranged upon opposite sides of the bracket 27, and adapted to be screwed up to rigidly clamp the bracket between the same, and hence rigidly attach the bracket to the tubular bearing. A clamping nut 30 has screw-threaded engagement with the tubular bearing 23 exteriorly of the end of the housing 16. I preferably arrange washers 31 upon opposite sides of the end of the housing. By slightly unscrewing the nut 30, the tubular bearing 23 may be turned with respect to the housing, and by screwing up the nut 30, the end of the housing will be clamped between the nuts 29 and 30, whereby the tubular bearing will in turn be rigidly secured to the housing. The turning of the tubular bearing is employed to adjust the tension of a coiled spring 32, the outer end of which is attached to the end of the bracket 27, and the inner end of which is attached to the shaft 22. It might be stated at this point that the coiled spring 32 is preferably employed to raise the shade, while the suction means is employed to lower it, although the reverse operation may be used. By adjusting the tension of the spring 32, by means of turning the tubular bearing 23, as explained, the extent of downward or closing movement of the shade may be regulated, its downward movement being limited when the turns of the spring close.

The roll 19 carries a flexible shade 33 which may be made of suitable fabric, or any other desired material. This shade has one end attached to the roll 19, by any suitable means, while its free end is provided with a hem 34, receiving a rod or stick 35. As clearly shown in Figure 7, when the shade is completely wound upon the roll 19, the stick 35 engages between the wound portion of the curtain and the top of the housing 16, thereby limiting the winding movement of the shade.

The suction operating means to shift the shade to one position, preferably the open position, embodies a cylinder 36, arranged within the forward portion of the housing 16 in advance of the roll 19. This cylinder extends longitudinally of the roll 19 and is preferably parallel with the same. The cylinder may be rigidly attached to the housing by any suitable means, and for the purpose of illustration, I have shown a bolt 37, which is rigidly carried by the cylinder and passes through an opening 38 in the side of the housing and is provided with a clamping nut 39 and a washer 40 upon the inner side of the housing. The bolt is clamped to the housing by screwing up the nut 39, as is obvious. Mounted to reciprocate within the cylinder 36 is a plunger 40', having suitable packing for effecting a gas-tight joint with the cylinder. A flexible element 41 is attached to the plunger 40' and may be in the form of a silk cord, wire, or the like. This flexible element passes through a tubular head 42, which may be held within the cylinder by frictional engagement or other suitable means. A tubular guide 43 is mounted in the outer end of the tubular head 40 and is preferably in the form of a smooth china or porcelain sleeve, although it may be formed of any suitable material. Any other suitable form of guide might be employed. The flexible element 41 is attached to the roll 19 at the point of attachment of the flexible shade 33 to the roll and the flexible element is wound with the shade upon the roll.

When the plunger 40' is acted upon by suction, it is drawn to the right, Figure 3, and pulls the flexible element 41, rotating the roll 19 in opposition to the spring 32, and unwinding the shade. When the suction is released from within the cylinder 36, the spring 32 rotates the roll 19 in an opposite direction to rewind the shade thereon, thereby returning the curtain to the raised position.

The suction line embodies a tube 44, such as a section of rubber tubing, one end of which is mounted upon a tubular coupling 45, secured to the closed head 46, of the cylinder 36. The tube 44 has its opposite end mounted upon a tubular coupling 47, extending through and carried by the end of the housing 16. A section of tubing 48 has one end mounted upon the outer end of the tubular coupling 47 and its opposite end mounted upon a tubular coupling 49. A section of tubing 50 has one end mounted upon a tubular coupling 51 and its opposite end mounted upon a tubular coupling 52, leading into the intake manifold 53 of the engine.

The suction line embodies a control valve device, and in this connection, attention is invited particularly to Figures 8 to 11, inclusive. This control device embodies a casing 54, preferably formed in casing sections 55 and 56, having telescoping ends 57 and 58, which have screw-threaded engagement, as shown. The tubular coupling 49 is carried by the casing section 55 and the tubular coupling 51 is carried by the casing section 56. Formed in the casing section 55, is a chamber 59, leading into a main longitudinal bore 60, in turn leading into the tubular coupling 49. A valve seat 61 surrounds the inner end of the bore 60, and is adapted to be engaged by a check valve 62. This check valve embodies a body portion 63, carrying a washer 64, formed of suitable compressible material, such as rubber or the like and held in place by a screw 65. Formed integral with the body portion 63 are guiding and spacing ribs 66, which are circumferentially spaced to permit of the free passage of air about the body portion 63. A light spring 67 is arranged behind the body portion 63 and serves to seat the valve element. Particular attention is called to the fact that the valve element seats in a direction away from the direction of suction from the intake manifold. The reason for this will be hereinafter explained. The casing section 55 is provided with a transverse opening 68, slidably receiving a valve stem 69, preferably having a snug fit therein. This valve stem passes through a sleeve 70 and has a milled head 71 rigidly attached to its outer end. A compressible coil spring 72 surrounds the valve stem 69 within the sleeve 70 and engages a washer 73, in turn engaging packing 74. By this means, an air-tight joint is effected between the valve stem and the wall of the opening 68. The valve stem also passes diametrically through the bore 60 and through a radial opening 74, having a slightly larger diameter than the valve stem to permit of the passage of air between the stem. A tapered valve seat 75 is formed at the outer end of the opening 74 and is adapted to be engaged by a tapered vent valve 76, carried by the outer end of the valve stem. The spring 72 serves to return the vent valve 76 to its seat and to hold the same seated until manually released. The casing section 54 is provided with a longitudinal port or bore 77, in communication with the tubular coupling 51 and an enlarged bore 78 which in turn is in free communication with the chamber 59. The casing section 56 has a radial opening 79 and an oppositely disposed radial opening 80, these openings being adapted to receive a cut-off valve element 81, adapted to move across the bore or port 77 and partly or completely cover and close the same. The valve element 81 is carried by a screw-threaded stem 82, engaging within a sleeve 83, carried by the casing section 56, and this stem is turned by a milled head 84. I preferably arrange a light spring 85 within the sleeve 83, inwardly of the stem 82, to prevent rattling.

The control valve device may be mounted at any convenient point upon the body of the automobile, and for the purpose of illustration, I have shown the same as mounted upon the dash 86. As one type of mounting, I provide a plate 87, Figures 8 and 9, having a bracket 88 rigidly attached thereto. This bracket carries a clamping screw 89, engaging with the dash 86, as shown. The plate 87 is equipped with sleeves 90 and 91, and the sleeve 70 extends through the sleeve 90, and the sleeve 83 through the sleeve 91. A bar 92 is attached to the bracket 88 by means of a screw 93 or the like, and this bar is secured to the casing sections 55 and 56 by screws 94.

The operation of the apparatus is as follows:

The spring 32 retains the shade 33 in the raised position, and the stick 35 co-acting with the rolled curtain and housing 16 serves to limit the winding movement of the shade. When the curtain is in the raised position, the plunger 40' is in the extreme position to the left, as indicated by dotted lines in Figure 3. To lower the shade, the driver turns the head 84, counter-clockwise, thereby shifting the valve element 81, to the open position, and placing the bore 77 in communication with the chamber 59. The engine being now in operation, the suction line is in communication with the intake manifold of the engine, the suction from the intake manifold acts upon the check valve 62, unseating the same and the suction is transmitted to the right end of the cylinder 36. The plunger 40' is now drawn to the right, pulling the flexible element 41, causing the same to turn the roll 19 and unwinding the shade 33 therefrom which is accordingly lowered. The extent of downward movement of the shade is regulated by the adjustment of the spring 32, as explained, the downward movement of the shade being stopped when the turns of the spring are closed. With the control valve thus remaining open and the engine operating, the shade will remain lowered. Should the degree of suction or vacuum drop in the manifold 53, while the shade is down, the check valve 62 will automatically close, which is due to the fact that the suction in the bore 60 and bore 78 are equal, the spring 67 then closing the check valve, or the suction in the bore 60 may be in excess of the suction in the bore 78. Hence the shade will remain lowered notwithstanding the fact that there may be a decided drop of suction in the manifold. This is an important feature of the invention as it prevents the improper movement of the shade, due to the varying suction in the intake manifold. If it is desired to temporarily raise the shade, the head 71 is depressed and the vent valve 76 unseated, the suction within the cylinder 36 being thereby broken and the spring 32 allowed to return the shade to the raised position. When the head 71 is released, the vent valve automatically closes and the suction will again lower the shade. When it is desired to have the shade raised for a considerable length of time, the control valve element 81 is closed, thus cutting off suction from the cylinder 36 and the vent valve 76 may be unseated, if found necessary.

It is to be understood that the form of my invention, herewith shown and described, is to be taken as a preferred example of the same, and that various changes in the shape, size and arrangement of parts, may be resorted to without departing from the spirit of my invention, or the scope of the subjoined claims.

Having thus described my invention, I claim:—

1. A window shade device comprising a roll, a shade attached to the roll, a spring to turn the roll in one direction to wind the shade thereon, a suction operated device connected with the roll to turn it in an opposite direction to unwind the shade therefrom, a suction line connected with the suction operated device and with the suction side of an internal combustion engine, a valve device connected in the suction line, including a control valve and a separate vent valve.

2. A window shade device comprising a roll, a curtain attached to the roll, a spring to turn the roll in one direction to wind the shade thereon, a suction operated device connected with the roll to turn it in an opposite direction to unwind the shade therefrom, a suction line connected with the suction operated device and with the suction side of an internal combustion engine, and a valve device connected in the suction line, including a control valve, a vent valve, and a check valve disposed between the first named valves and seating toward the vent valve.

3. A window shade device comprising a roll, a curtain attached to the roll, means to turn the roll in a direction to wind the shade thereon, a suction operated device connected with the roll, to turn it in an opposite direction to unwind the shade therefrom, a suction line connected with the suction operated device and with the suction side of an internal combustion engine, a valve to cover and uncover the bore of the suction line at a point between the engine and suction operated device, and automatic means to prevent the sudden drop of suction within the line between the valve and the suction operated device when the suction suddenly drops in the line between the valve and the engine.

4. A window shade device comprising a roll, a shade attached to the roll, means to turn the roll in a direction to wind the shade thereon, a suction operated device connected with the roll to turn it in an opposite direction to unwind the shade therefrom, a suction line connected with the suction operated device and with the suction side of an internal combustion engine, a valve to cover and uncover the bore of the suction line at a point between the engine and the suction operated device, automatic means to prevent the sudden drop of suction within the line between the valve and the suction operated device when the suction suddenly drops in the line between the valve and the engine, and means to vent the suction line between the valve and the suction operated device.

5. A window shade device comprising a movable curtain, a suction operated device connected with the shade to move the same, a suction line connected with the suction operated device and with the suction side of an internal combustion engine, a valve to cover and uncover the bore of the suction line at a point between the engine and the suction operated device, and automatic means to prevent the sudden drop of suction within the line between the valve and the suction operated device when the suction suddenly drops in the line between the valve and the engine.

6. A window shade device comprising a movable shade, a spring to move the curtain in one direction, a suction operated device connected with the shade to move the same in opposition to the spring, a suction line connected with the suction operated device and with the suction side of an internal combustion engine, an adjustable rotary control valve to cover and uncover the bore of the suction line, and a self-closing reciprocatory vent valve connected in the suction line and movable independently of the control valve, said vent valve being arranged between the control valve and the suction operated device.

In testimony whereof I affix my signature.

ELMER R. LAWTON.